(12) United States Patent
Kuriyama et al.

(10) Patent No.: US 7,154,551 B2
(45) Date of Patent: Dec. 26, 2006

(54) IMAGING DEVICE WITH SOLID OPTICAL MEMBER

(75) Inventors: Akihiko Kuriyama, Nara (JP);
Masayuki Ehiro, Osaka (JP); Kiyoshi Kumata, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 712 days.

(21) Appl. No.: 10/068,150

(22) Filed: Feb. 6, 2002

(65) Prior Publication Data

US 2002/0109773 A1 Aug. 15, 2002

(30) Foreign Application Priority Data

Feb. 9, 2001 (JP) ............................. 2001-034692

(51) Int. Cl.
*H04N 5/225* (2006.01)
*G02B 13/16* (2006.01)

(52) U.S. Cl. .................. 348/335; 348/373; 348/36; 359/725; 359/726

(58) Field of Classification Search ............. 348/36, 348/143, 335, 337, 373, 374, 375, 340, 39; 396/351, 352, 21, 427, 36, 143; 359/505, 359/725, 359, 834, 351, 352, 726, 727, 592, 359/597, 869

See application file for complete search history.

(56) References Cited

U.S. PATENT DOCUMENTS

| | | | | |
|---|---|---|---|---|
| 1,653,575 A | * | 12/1927 | Kirtane .................. | 359/505 |
| 5,115,266 A | * | 5/1992 | Troje ..................... | 396/21 |
| 5,452,135 A | * | 9/1995 | Maki et al. ............. | 359/834 |
| 5,745,286 A | * | 4/1998 | Hawryluk .............. | 359/359 |
| 6,028,719 A | * | 2/2000 | Beckstead et al. ..... | 359/725 |
| 6,130,783 A | * | 10/2000 | Yagi et al. .............. | 359/627 |
| 6,157,018 A | * | 12/2000 | Ishiguro et al. ........ | 250/208.1 |
| 6,333,826 B1 | * | 12/2001 | Charles ................... | 359/725 |
| 6,341,044 B1 | * | 1/2002 | Driscoll et al. ........ | 359/725 |
| 6,375,366 B1 | * | 4/2002 | Kato et al. .............. | 396/351 |
| 6,426,774 B1 | * | 7/2002 | Driscoll et al. ........ | 348/335 |

(Continued)

FOREIGN PATENT DOCUMENTS

JP      11-174603      7/1999

(Continued)

OTHER PUBLICATIONS

Yamazawa et al. "Obstacle Detection with Omnidirectional Image Sensor", 1995, HyperOmni Vision, IEEE International Conference on Robotics and Automation.*

(Continued)

*Primary Examiner*—Vivek Srivastava
*Assistant Examiner*—Nelson D. Hernandez
(74) *Attorney, Agent, or Firm*—David G. Conlin; Steven M. Jensen; Edwards Angell Palmer & Dodge LLP

(57) ABSTRACT

An imaging device includes a convex mirror for reflecting first incident light representing an object, the convex mirror having a shape of solid of revolution; an imaging mechanism for taking a reflected image represented by light reflected in the convex mirror; and an optical member for guiding the first incident light toward the convex mirror and guiding the reflected light toward the imaging mechanism, the optical member having an attenuation section for attenuating second incident light which is incident on an outer circumferential surface of the optical member in an opposite direction to the first incident light, passes through the optical member, is reflected by an inner circumferential surface of the optical member so as to be directed toward the convex rotational mirror, and is superimposed on the first incident light.

11 Claims, 7 Drawing Sheets

U.S. PATENT DOCUMENTS

| | | | |
|---|---|---|---|
| 6,611,282 B1 * | 8/2003 | Trubko et al. | 348/36 |
| 6,704,148 B1 * | 3/2004 | Kumata | 359/725 |
| 6,738,569 B1 * | 5/2004 | Sogabe et al. | 396/21 |
| 6,865,029 B1 * | 3/2005 | Kuriyama et al. | 359/726 |
| 2003/0099045 A1 * | 5/2003 | Doi | 359/725 |

FOREIGN PATENT DOCUMENTS

| | | |
|---|---|---|
| WO | WO 97/50252 | 12/1997 |
| WO | WO 00/41024 | 7/2000 |

OTHER PUBLICATIONS

Yamazawa et al. "Omnidirectional laging with Hyperboloidal Projection", 1993 IEEE International Conference on Intelligent Robots and Systems.*

Marquez et al. "Vision-Based Self-Localization for Soccer Robots", 2000 IEEE International Conference on Intelligent Robots and Systems.*

European Search Report mailed Feb. 11, 2004 (3 pp.) for corresponding application No. 02250842.8-2217.

* cited by examiner

IMAGING DEVICE WITH SOLID OPTICAL MEMBER

BACKGROUND OF THE INVENTION

1. Field of the Invention

The present invention relates to an imaging device capable of imaging objects in a maximum of the omniazimuthal angle of 360 degrees and used in the field of visual systems such as, for example, surveillance cameras.

2. Description of the Related Art

Recently in the field of visual systems such as, for example, surveillance cameras, various attempts have been made to allow a camera to perform monitoring operations conventionally conducted by the human eye, by combining the camera with a computer.

A generally used camera, which has a limited viewing angle, is not suitable for such applications. Therefore, cameras using fish-eye lenses or other wide-angle lenses have been developed. For example, in the field of movable robots, the use of convex mirrors having a shape of solid of revolution (such as conical mirrors), spherical mirrors or the like, have been actively studied. (Hereinafter, such convex mirrors will be referred to as "convex rotatable mirrors".) According to systems studied in this field, an optical image of a viewing angle of 360 degrees is taken by a convex rotatable mirror, then the optical image is converted into a video image, and the video image is further converted into a desired image by a computer.

FIG. 9 is a projection figure of an imaging device 90 using a conventional convex rotational mirror. The imaging device 90 includes a convex rotational mirror unit 91. The convex rotational mirror unit 91 includes a generally disc-shaped base 92 and a convex rotational mirror 93 provided on a surface of the base 92. The imaging device 90 further includes a generally cylindrical optical member 94. The optical member 94 is open toward the convex rotational mirror unit 91 and covers the surface of the base 92 and the convex rotational mirror 93. The optical member 94 holds the convex rotational mirror unit 91 and is formed of a light-transmissive material. An inner circumferential surface of the optical member 94 and the convex rotational mirror 93 interpose a hollow space therebetween. The optical member 94 has a thickness which is sufficiently thin to allow light which is incident on an outer circumferential surface of the optical member 94 to be transmitted through the optical member 94, so that it is proximately parallel to light which is directed toward the convex rotational mirror 93 from the inner circumferential surface of the optical member 94.

A generally cylindrical imaging mechanism 98 is attached at the opposite side to the convex rotational mirror unit 91, with the optical member 94 interposed therebetween. The imaging mechanism 98 includes a lens 99 facing an opening of the optical member 94, which is formed on the opposite side to the convex rotational mirror unit 91, and an imaging section 90 provided on the opposite side to the optical member 94, with the lens 99 interposed therebetween. The imaging section 90 is connected to a signal processing section 88 provided for adjusting distortion of an image taken by the imaging mechanism 98.

As described above, the light-transmissive optical member 94 is used for holding the convex rotational mirror unit 91, and thus a separate holding member is not provided. The reason is that if a separate holding member is provided for holding the convex rotational mirror unit 91, an image of the holding member itself would be taken and so would be a part of an image taken by the imaging mechanism 98.

The imaging device 90 having the above-described structure operates as follows.

Light 71 is incident on the outer circumferential surface of the light-transmissive optical member 94 and is transmitted through the optical member 94. While being transmitted through the optical member 94, the incident light 71 is refracted twice (not shown) so as to become light 72. The light 72 is directed from the inner circumferential surface of the optical member 94 toward the convex rotational mirror 93 through the hollow space between the optical member 94 and the convex rotational mirror 93. Then, the light 72 is reflected by the convex rotational mirror 93 and is directed toward the imaging mechanism 98 as reflected light 81. The reflected light 81 is transmitted through the lens 99 of the imaging mechanism 98 and is incident on the imaging section 90. The imaging section 90 converts the reflected light 81 into an image signal representing an image and outputs the image signal to the signal processing section 88. The signal processing section 88 processes the received image signal so as to adjust the distortion of the image.

Light 73, which is incident on the outer circumferential surface of the light-transmissive optical member 94 from the opposite direction to the light 71, is transmitted through the optical member 94. While being transmitted through the optical member 94, the incident light 73 is refracted twice (not shown) so as to become light 74. The light 74 is directed from a portion of the inner circumferential surface of the optical member 94 toward another portion of the inner circumferential surface of the optical member 94 opposite the portion from which the light 74 is directed. The light 74 is reflected by the inner circumferential surface of the optical member 94 and is directed toward the convex rotational mirror 93 as reflected light 82. Thus, the reflected light 82 is superimposed on the light 72 directed toward the convex rotational mirror 93.

Normally, an image produced by the imaging device 90 representing the reflected light 81 reflected by the convex rotational mirror 93 is supposed to be based only on the incident light 71. When the reflected light 82 is superimposed on the light 72, however, an image produced by the imaging device 90 undesirably includes both an image based on the incident light 71 and another image based on the incident light 73 in a superimposed state.

Japanese Patent Publication (Kokai) No. heisei 11-174603 discloses an imaging device having a structure for solving this problem. In this publication, attention is paid to the fact that incident light reflected by an inner surface of an optical member and directed to a convex rotational mirror crosses the rotation axis of the convex rotational mirror. A rod-like member for shielding the incident light directed to the inner surface of the optical member is provided along the rotation axis of the convex rotational mirror. Thus, the incident light directed to the inner surface of the optical member is prevented from being reflected by the inner surface and thus prevented from being directed toward the convex rotational mirror.

However, the technology described in the above-mentioned publication has the following problems.

Since the rod-like member is required to be additionally provided, the structure of the imaging device is complicated and the number of production steps of the imaging device is increased.

Since the optical member is hollow, a structure is required to mechanically support the rod-like member provided along the rotation axis of the convex rotational mirror so that the rod-like member is not destroyed when the imaging device is actually used.

SUMMARY OF THE INVENTION

According to one aspect of the invention, an imaging device includes a convex mirror for reflecting first incident light representing an object, the convex mirror having a shape of solid of revolution; an imaging mechanism for taking a reflected image represented by light reflected in the convex mirror; and an optical member for guiding the first incident light toward the convex mirror and guiding the reflected light toward the imaging mechanism, the optical member having an attenuation section for attenuating second incident light which is incident on an outer circumferential surface of the optical member in an opposite direction to the first incident light, passes through the optical member, is reflected by an inner circumferential surface of the optical member so as to be directed toward the convex rotational mirror, and is superimposed on the first incident light.

In one embodiment of the invention, the attenuation section is a hole formed in the optical member, and the hole contains an air layer therein having a different light transmittance from that of the optical member so that the second incident light is attenuated by crossing the hole.

In one embodiment of the invention, the hole is shaped so as not to obstruct a viewing angle provided by the convex rotational mirror.

In one embodiment of the invention, the hole is shaped as a body of revolution centered around a rotation axis of the convex rotational mirror.

In one embodiment of the invention, the hole is cylindrical.

In one embodiment of the invention, the hole is conical.

In one embodiment of the invention, the hole has a frosted surface for attenuating the second incident light.

In one embodiment of the invention, the imaging device further includes an electric wire for supplying electric power and a signal to the imaging mechanism, the electric wire passing through the hole and connected to the imaging mechanism.

In one embodiment of the invention, the hole is tapped for attaching the imaging device to an external member.

According to another aspect of the invention, an imaging device includes a convex mirror for reflecting first incident light representing an object, the convex mirror having a shape of solid of revolution; an imaging mechanism for taking a reflected image represented by light reflected in the convex mirror; and an optical member for guiding the first incident light toward the convex mirror and guiding the reflected light toward the imaging mechanism, the optical member having a light-shielding section for shielding second incident light which is incident on an outer circumferential surface of the optical member in an opposite direction to the first incident light and passes through the optical member toward an inner circumferential surface of the optical member.

In one embodiment of the invention, the light-shielding section is a hole formed in the optical member, and the imaging device further includes a light-shielding thin film for shielding the second incident light.

Hereinafter, the function of the present invention will be described.

According to the present invention, the optical member of the imaging device is not hollow, unlike a conventional imaging device, and is filled with a light-transmissive material such as, for example, a light-transmissive resin or glass. The optical member has a hole centered around the rotation axis of a convex rotational mirror. The air layer contained in the hole has a different light transmittance from that of the optical member. Therefore, an image produced by the imaging device does not include another image based on the light reflected by an inner surface of the optical member. This provides a clear image based only on the necessary light. The size of the hole can be appropriately determined based on the shape of the convex rotational mirror, imaging conditions and the like.

The hole can have any shape, but preferably has a shape of a body of revolution such as, for example, a conical or cylindrical shape along the rotation axis of the convex rotational mirror. With such a shape, the influence of the light reflected by the inner surface of the optical member on the produced image is reduced, regardless of the direction in which light is incident on the optical member.

As described below in a second example of the present invention, a light-shielding thin film formed of a material absorbing or diffusely reflecting light can be provided on an inner surface of the hole by application or vapor deposition. The light-shielding thin film absorbs or diffusely reflects the light, and thus attenuates or shields unnecessary light. As a result, a clear image based only on the necessary light is produced. The light-shielding thin film can be light-absorbing or light-reflecting, but a light-absorbing film is preferable in order to substantially completely avoid the influence of reflected light. A light-reflecting film can be produced in the same step as the thin film for forming the convex rotational mirror.

As described below in a third example of the present invention, the inner surface of the hole can be frosted. Such an inner surface absorbs or diffusely reflects the light, and thus attenuates or shields unnecessary light. As a result, a clear image based only on the necessary light is produced.

As described below in a fourth example of the present invention, an electric wire connected to an imaging mechanism is allowed to pass through the hole. In this way, the electric wire is prevented from being included in an image taken by the imaging device.

As described below in a fifth example of the present invention, the hole can be tapped. This facilitates the assembly of the imaging device with an external member.

Thus, the invention described herein makes possible the advantages of providing (1) an imaging device for providing a clear image with a simple structure; and (2) an imaging device for providing a clear image without an increase in the number of production steps therefor.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
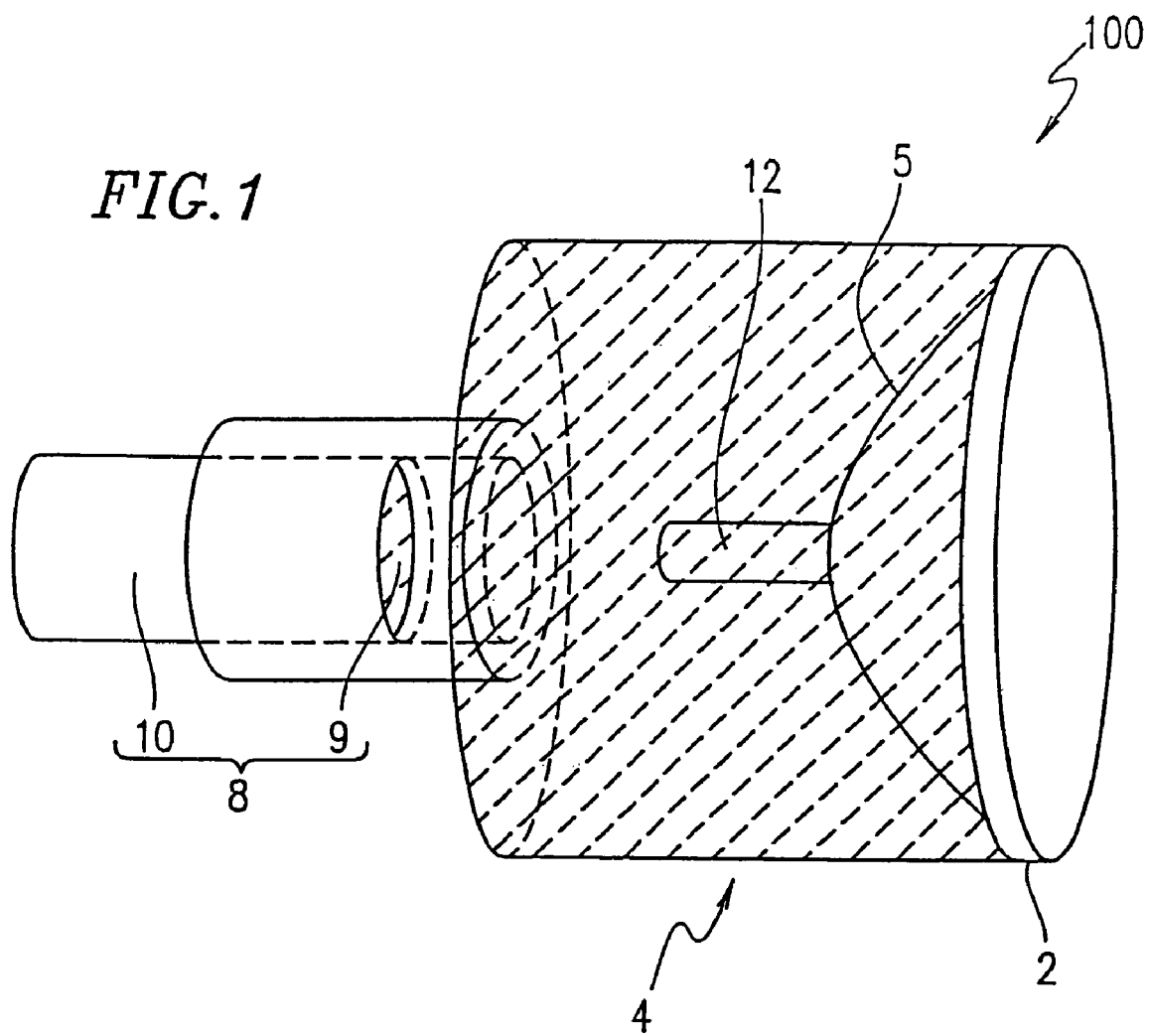
FIG. 1 is a projection figure illustrating a schematic structure of an imaging device according to a first example of the present invention.
Figure 2:
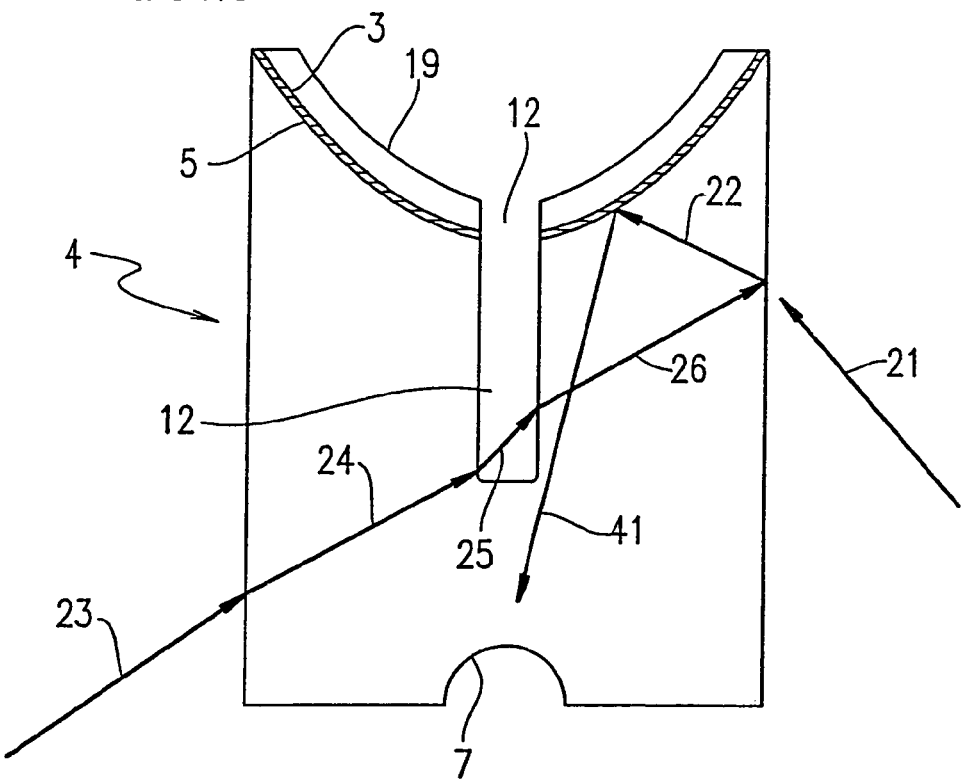
FIG. 2 is a cross-sectional view of the imaging device shown in FIG. 1.

FIG. 1 is a projection figure schematically illustrating a structure of an imaging device 100 according to a first example of the present invention. FIG. 2 is a partial cross-sectional view of the imaging device 100 shown in FIG. 1.

The imaging device 100 includes a generally cylindrical optical member 4. The optical member 4 is formed of a material which is light-transmissive and is unlikely to allow moisture to permeate therethrough, such as an acrylic resin, polycarbonate, light-transmissive glass or the like. A bottom surface of the optical member 4 has a recessed portion 5 (shaped as a body of revolution) and centered around the central axis of the optical member 4. In the example shown in FIG. 1, the recessed portion 5 is hyperbolic.

A thin-film convex rotational mirror 3 is provided in close contact with the recessed portion 5. The convex rotational mirror 3 is also shaped as a body of revolution and centered around the central axis of the optical member 4. In the example shown in FIG. 1, a surface of the convex rotational mirror 3 is hyperbolic. The recessed portion 5 and the surface of the convex rotational mirror 3 may be semi-spherical or conical.

Figure 9:
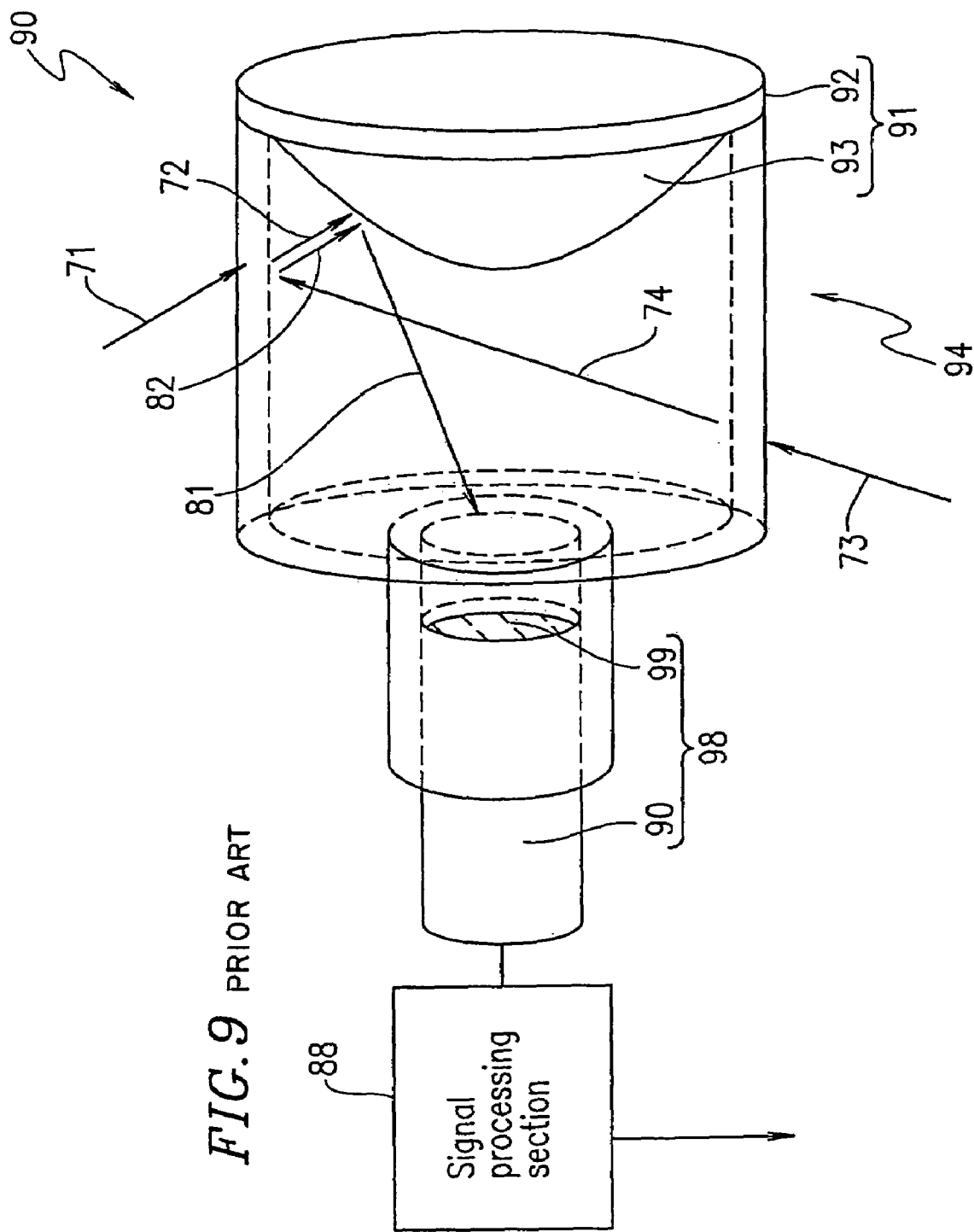
FIG. 9 is a projection figure illustrating a schematic structure of a conventional imaging device.

The convex rotational mirror 3 is formed of a metal material such as, for example, aluminum or stainless steel. The convex rotational mirror 3 may alternatively be formed on the recessed portion 5 by vapor-depositing, sputtering or plating a material having a mirror surface effect such as, for example, aluminum, silver, platinum, a nickel-chromium alloy or gold. In this way, the convex rotational mirror 3 is formed to be in close contact with the recessed portion 5 of the optical member 4, unlike the conventional imaging device 90 described above with reference to FIG. 9 including the hollow optical member 94.

A protective layer 19 for protecting the thin-film convex rotational mirror 3 is provided on the convex rotational mirror 3. The convex rotational mirror 3 and the protective layer 5 are covered with a disc-shaped lid 2.

The optical member 4 has a cylindrical hole 12 (shaped as a body of revolution) centered around the central axis of the optical member 4. The cylindrical hole 12 is open toward the recessed portion 5. Another bottom surface of the optical member 4 which is opposite to the bottom surface having the recessed portion 5 has a semi-spherical reflected light releasing face 7 centered around the central axis of the optical member 4.

A generally cylindrical imaging mechanism 8 is provided on the opposite side to the convex rotational mirror 3, with the optical member 4 interposed therebetween. The imaging mechanism 8 includes a lens 9 provided so as to face the reflected light releasing face 7 of the optical member 4. The lens 9 is located so that an optical axis thereof matches the rotation axis of the optical member 4 and the convex rotational mirror 3. Thus, the lens 9 converges light reflected by the convex rotational mirror 3. An imaging section 10 is provided on the opposite side to the optical member 4, with the lens 9 interposed therebetween. The imaging section 10 is formed of a CCD or the like. The imaging section 10 generates an image signal representing a reflected image based on the reflected light converged by the lens 9, and outputs the image signal to a signal processing section (not shown). The signal processing section adjusts the distortion of the image signal which is output from the imaging section 10.

The imaging device 100 having the above-described structure operates as follows.

Incident light 21 which is incident on an outer circumferential surface of the optical member 4 formed of a light-transmissive material is refracted by the outer circumferential surface so as to become light 22. The light 22 passes through the optical member 4 and reaches the convex rotational mirror 3 which is in close-contact with the optical member 4.

The light 22 incident on the convex rotational mirror 3 is reflected by the surface of the convex rotational mirror 3 so as to become reflected light 41. The reflected light 41 passes through the reflected light releasing face 7 of the optical member 4 and is converged by the lens 9 in the imaging mechanism 8. The imaging section 10 generates an image signal representing a reflected image based on the reflected light 41 converged by the lens 9, and outputs the image signal to the signal processing section (not shown). The signal processing section adjusts the distortion of the image signal which is output from the imaging section 10.

Incident light 23, which is incident on the outer circumferential surface of the optical member 4 from the opposite direction to the incident light 21, is refracted so as to become light 24. The light 24 is incident on the cylindrical hole 12. Then, the light 24 is partially reflected by a wall of the cylindrical hole 12, and is partially refracted by the wall of the cylindrical hole 12 so as to become light 25. The light 25 crosses the cylindrical hole 12 and is directed to a portion of the wall of the cylindrical hole 12 which is opposite to a portion of the wall on which the light 24 is incident. The light 25 reaching the portion of the wall of the cylindrical hole 12 is partially reflected by the wall, and is partially refracted by the wall so as to become light 26. The light 26 exiting the cylindrical hole 12 is directed to the inner circumferential surface of the optical member 4 at a portion opposite to a portion of the outer circumferential surface on which the light 23 is incident.

Thus, the light 24 incident on the optical member 4 is attenuated by being reflected and refracted by the wall of the cylindrical hole 12, and therefore the intensity of the light 25 is lower than the intensity of the light 24. The light 25 is also attenuated by being reflected and refracted by the wall of the cylindrical hole 12, and therefore the intensity of the light 26 is lower still than the intensity of the light 25.

The light 26 incident on the inner circumferential surface of the optical member 4 is reflected by the inner circumferential surface and is superimposed on the light 22 directed toward the convex rotational mirror 23. The light 26 has been attenuated as a result of being reflected twice and refracted twice by the wall of the cylindrical hole 12 and thus has a very low intensity. Therefore, the influence of the light 26 on the image provided by the imaging device 100 is negligible. Thus, an image represented only by the incident light 21 can be provided.

As described above, in the first example of the present invention, the cylindrical hole 12 formed in the optical member 4 attenuates the light, which is incident on the optical member 4 from the opposite direction to the incident light 21, passes through the optical member 4, is reflected by the inner circumferential surface of the optical member 4 to be directed toward the convex rotational mirror 3 and is superimposed on the light 22 also directed toward the convex rotational mirror 3. Therefore, it is not necessary to additionally provide a rod-like member for shielding the light and thus preventing the light from being superimposed on the light 22. The imaging device 100 can provide a clear image with a simple structure without an increase in the number of production steps therefor.

The reflected light releasing face 7 is semi-spherical. Therefore, the reflected light 41 reflected by the convex rotational mirror 3 passes through the reflected light releasing face 7 in a direction normal to the reflected light releasing face 7. The reflected light 41 is not refracted regardless of the material used to form the optical member 4. For this reason, the optical system can be designed with ease.

Figure 3:
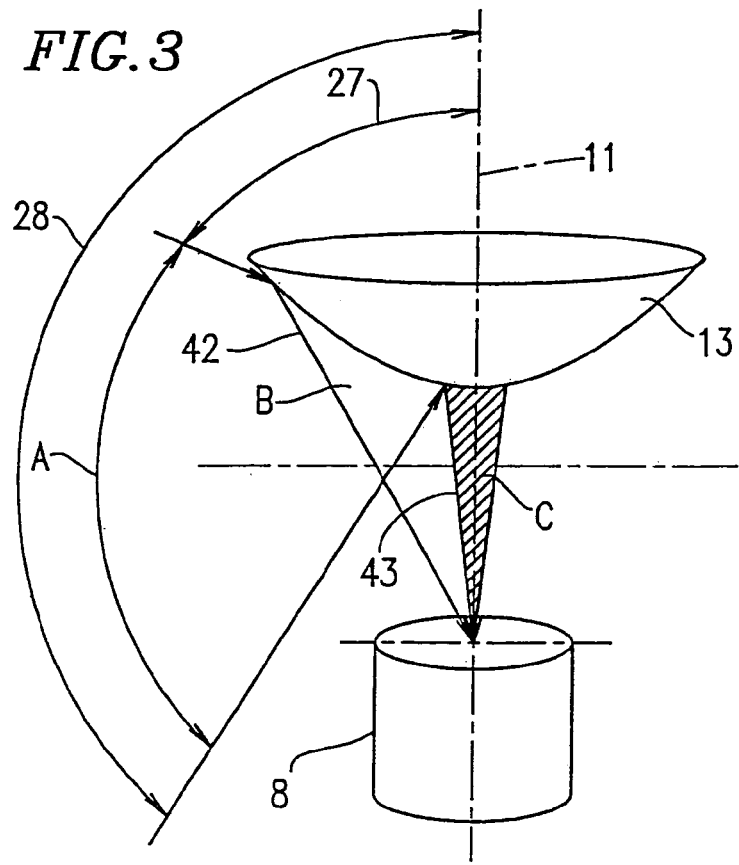
FIG. 3 is a view provided to illustrate a preferable shape of a hole formed in an optical member of the imaging device shown in FIG. 1.

FIG. 3 is a view provided to illustrate a preferable shape of a cylindrical hole formed in an optical member. Identical elements previously discussed with respect to FIGS. 1 and 2 bear identical reference numerals therewith and the detailed descriptions thereof will be omitted.

Where the incident angle of light to be reflected by the convex rotational mirror 3 is in the range of angle 27 and angle 28, the viewing angle provided by the convex rotational mirror 3 is in viewing angle range A and the light reflected by the convex rotational mirror 3 crosses area B and is directed toward the imaging mechanism 8. Therefore, the reflected light crosses a space, obtained by rotating area B around a central axis 11 of the convex rotational mirror 3. The reflected light does not cross a conical space obtained by rotating area C, inside area B, around the central axis 11 of the convex rotational mirror 3. In other words, the conical space obtained by rotating area C around the central axis 11 does not obstruct the viewing angle provided by the convex rotational mirror 3.

In the case where the cylindrical hole 12 shown in FIG. 2 has the shape of the conical space obtained by rotating area C around the central axis 11, an image of an object represented by the incident light can be taken without obstructing the viewing angle provided by the convex rotational mirror 3 and the light incident on the optical member 4 and directed to an opposite portion of the optical member 4 can still be attenuated.

EXAMPLE 2

Figure 4:
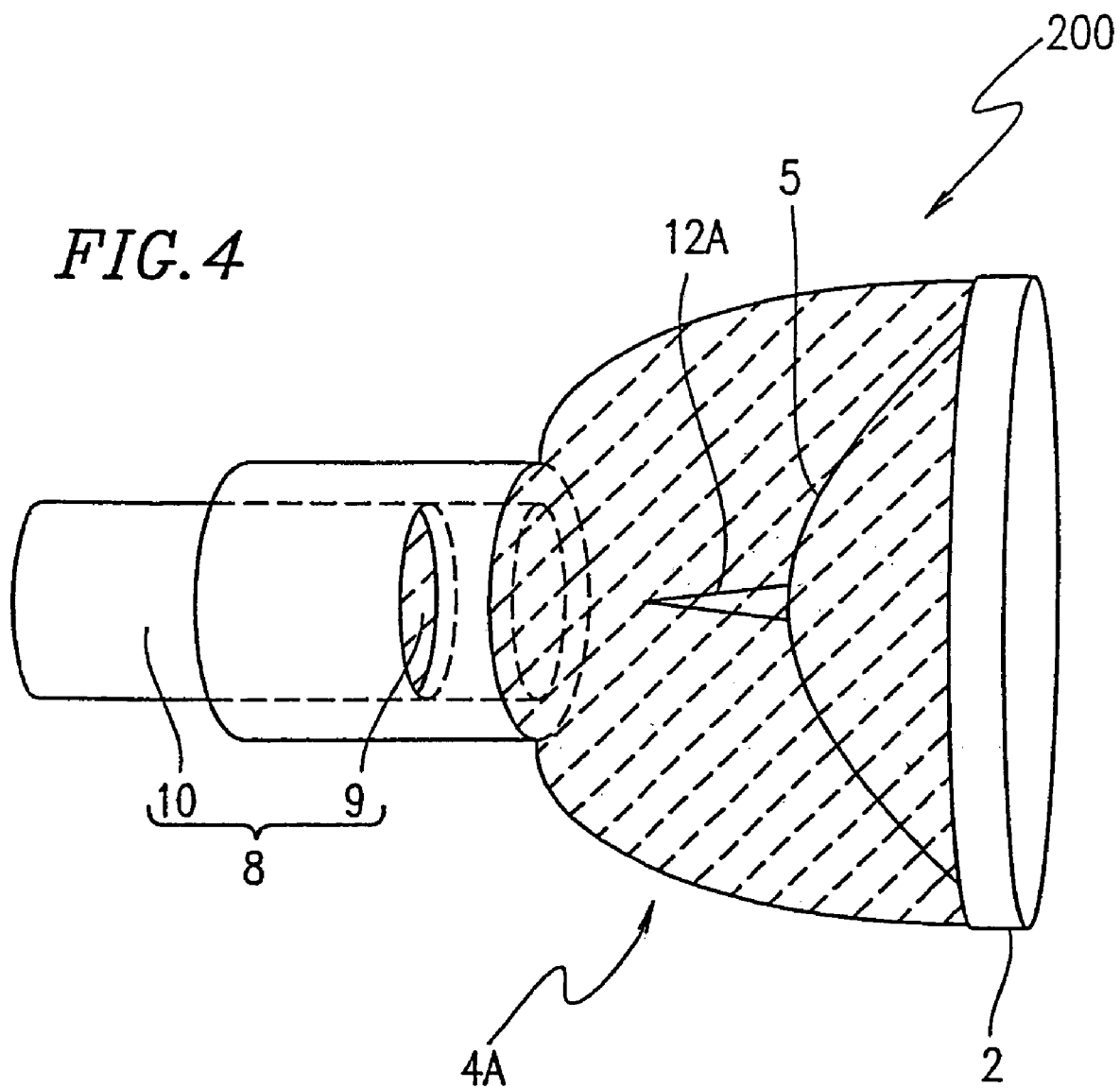
FIG. 4 is a projection figure illustrating a schematic structure of an imaging device according to a second example of the present invention.
Figure 5:
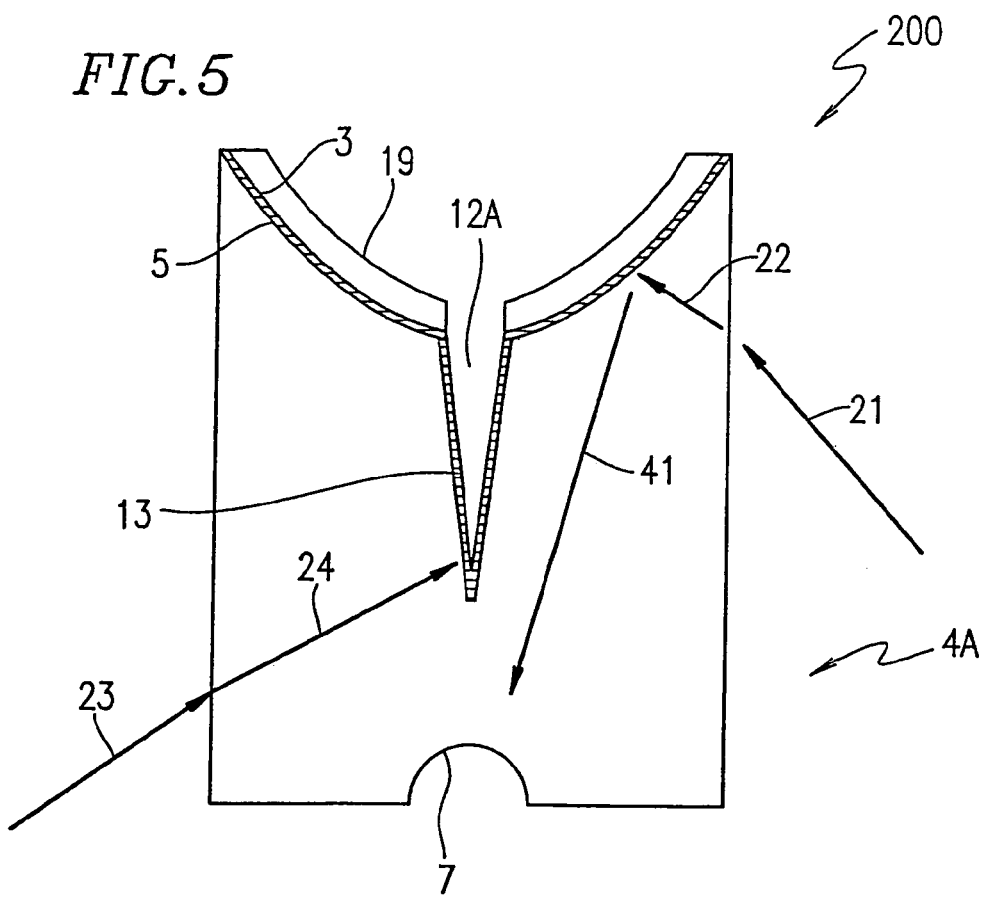
FIG. 5 is a cross-sectional view of the imaging device shown in FIG. 4.

FIG. 4 is a projection figure schematically illustrating a structure of an imaging device 200 according to a second example of the present invention. FIG. 5 is a partial cross-sectional view of the imaging device 200 shown in FIG. 4. Identical elements previously discussed with respect to FIGS. 1 and 2 bear identical reference numerals therewith and the detailed descriptions thereof will be omitted. In the imaging device 200 in the second example, unlike the imaging device 100 in the first example, an optical member 4A shaped as a body of revolution has a conical hole 12A (shaped as a body of revolution), and a light-shielding thin film 13 is provided on an inner surface of the conical hole 12A.

The conical hole 12A is centered around the central axis of the optical member 4A and is open toward the recessed portion 5. The conical hole 12A is formed so as not to obstruct the viewing angle provided by the convex rotational mirror 3, as described above with reference to FIG. 3. The light-shielding thin film 13 formed on an inner surface of the conical hole 12A is preferably formed of a light-absorbing material. The light-shielding thin film 13 may alternatively be formed of a material diffusely reflecting light.

The imaging device 200 having the above-described structure operates as follows.

Incident light 21 which is incident on an outer circumferential surface of the optical member 4A formed of a light-transmissive material is refracted by the outer circumferential surface so as to become light 22. The light 22 passes through the optical member 4A and reaches the convex rotational mirror 3 which is in close-contact with the recessed portion 5 of the optical member 4A.

The light 22 incident on the convex rotational mirror 3 is reflected by the surface of the convex rotational mirror 3 so as to become reflected light 41. The reflected light 41 passes through the reflected light releasing face 7 of the optical member 4A and is converged by the lens 9 in the imaging mechanism 8. The imaging section 10 generates an image signal representing a reflected image based on the reflected light 41 converged by the lens 9, and outputs the image signal to the signal processing section (not shown). The signal processing section adjusts the distortion of the image signal which is output from the imaging section 10.

The incident light 23, which is incident on the outer circumferential surface of the optical member 4A from the opposite direction to the incident light 21, is refracted so as to become light 24. The light 24 is incident on the conical hole 12A. The light-shielding thin film 13 provided on the inner surface of the conical hole 12A absorbs the light 24, thus preventing the light 24 from reaching a portion of the inner circumferential surface of the optical member 4A opposite to a portion of the outer circumferential surface on which the light 23 is incident. Therefore, the light 24 is not superimposed on the light 22.

As described above, in the second example of the present invention, the light-shielding thin film 13 shields the light 24 incident on the conical hole 12A from the outer circumferential surface of the optical member 4. Therefore, the light 24 is prevented from reaching the opposite portion of the outer circumferential surface and thus is not superimposed on the light 22. As a result, the imaging device 200 can provide a clear image with a simple structure without an increase in the number of production steps therefor.

EXAMPLE 3

Figure 6:
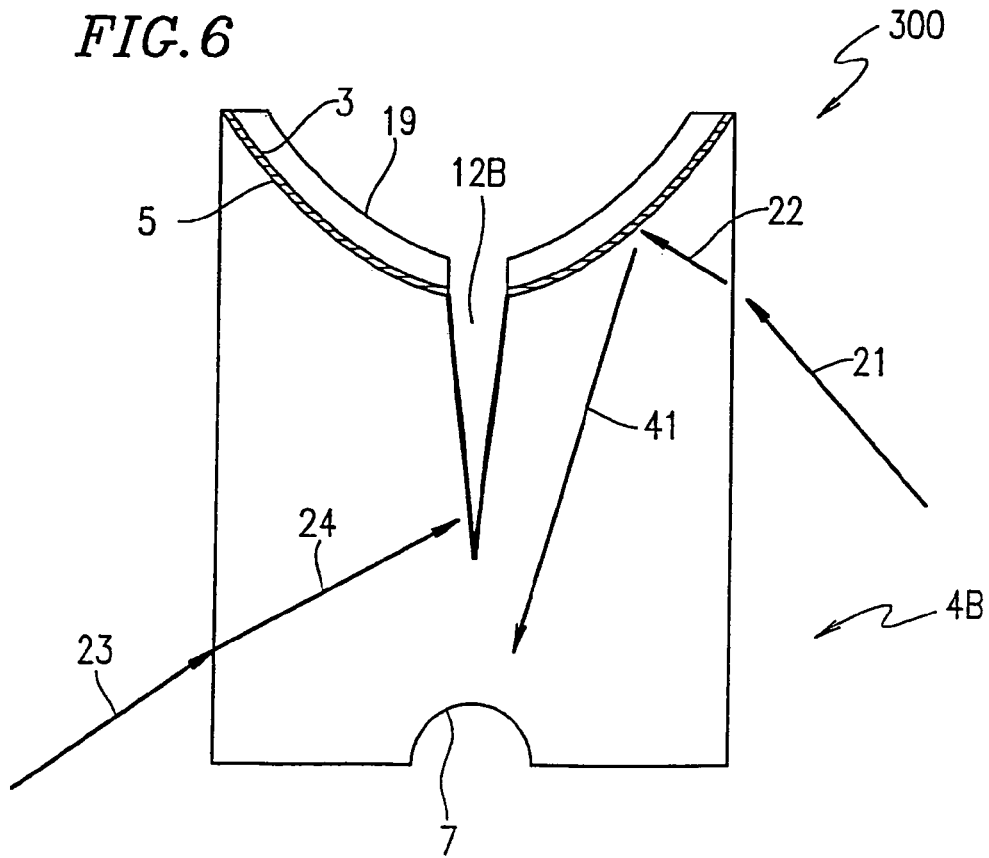
FIG. 6 is a cross-sectional view illustrating a structure of an imaging device according to a third example of the present invention.

FIG. 6 is a cross-sectional view of an imaging device 300 according to a third example of the present invention. Identical elements previously discussed with respect to FIGS. 4 and 5 bear identical reference numerals therewith and the detailed descriptions thereof will be omitted. In the imaging device 300 in the third example, unlike the imaging device 200 in the second example, an optical member 4B has a conical hole 12B (shaped as a body of revolution) and the conical hole 12B has a frosted inner surface for attenuating light incident thereon.

The conical hole 12B is centered around the central axis of the optical member 4B and is open toward the recessed portion 5.

The imaging device 300 having the above-described structure operates as follows.

Incident light 21 which is incident on an outer circumferential surface of the optical member 4B formed of a light-transmissive material is refracted by the outer circumferential surface so as to become light 22. The light 22 passes through the optical member 4B and reaches the convex rotational mirror 3 which is in close-contact with the recessed portion 5 of the optical member 4B.

The light 22 incident on the convex rotational mirror 3 is reflected by the surface of the convex rotational mirror 3 so as to become reflected light 41. The reflected light 41 passes through the reflected light releasing face 7 of the optical member 4B and is converged by the lens 9 in the imaging mechanism 8 (FIG. 1). The imaging section 10 generates an image signal representing a reflected image based on the reflected light 41 converged by the lens 9, and outputs the image signal to the signal processing section (not shown). The signal processing section adjusts the distortion of the image signal which is output from the imaging section 10.

The incident light 23, which is incident on the outer circumferential surface of the optical member 4B from the opposite direction to the incident light 21, is refracted so as to become light 24. The light 24 is incident on the conical hole 12B. The light 24 is diffusely reflected by the frosted inner surface of the conical hole 12B and thus is attenuated. The light is further diffusely reflected and thus attenuated by a portion of the inner surface of the conical hole 12B opposite to a portion of the inner surface on which the light is incident. Then, the light exits the conical hole 12B and is reflected by a portion of the inner circumferential surface of the optical member 4B opposite to a portion of the outer circumferential surface on which the light 23 is incident. Although the light reflected by the inner circumferential surface is superimposed on the light 22, the intensity of the light is negligible.

As described above, in the third example of the present invention, the frosted inner surface of the conical hole 12B attenuates the light incident thereon. Therefore, the intensity of the light reflected by the inner circumferential surface of the optical member 4B and superimposed on the light 22 is negligible. As a result, the imaging device 300 can provide a clear image with a simple structure without an increase in the number of production steps therefor.

Since the conical hole 12B has a frosted inner surface, the number of production steps of the imaging device can be reduced as compared to that of the imaging device 200 including the light-shielding thin film 13 on an inner surface of the conical hole 12A.

EXAMPLE 4

Figure 7:
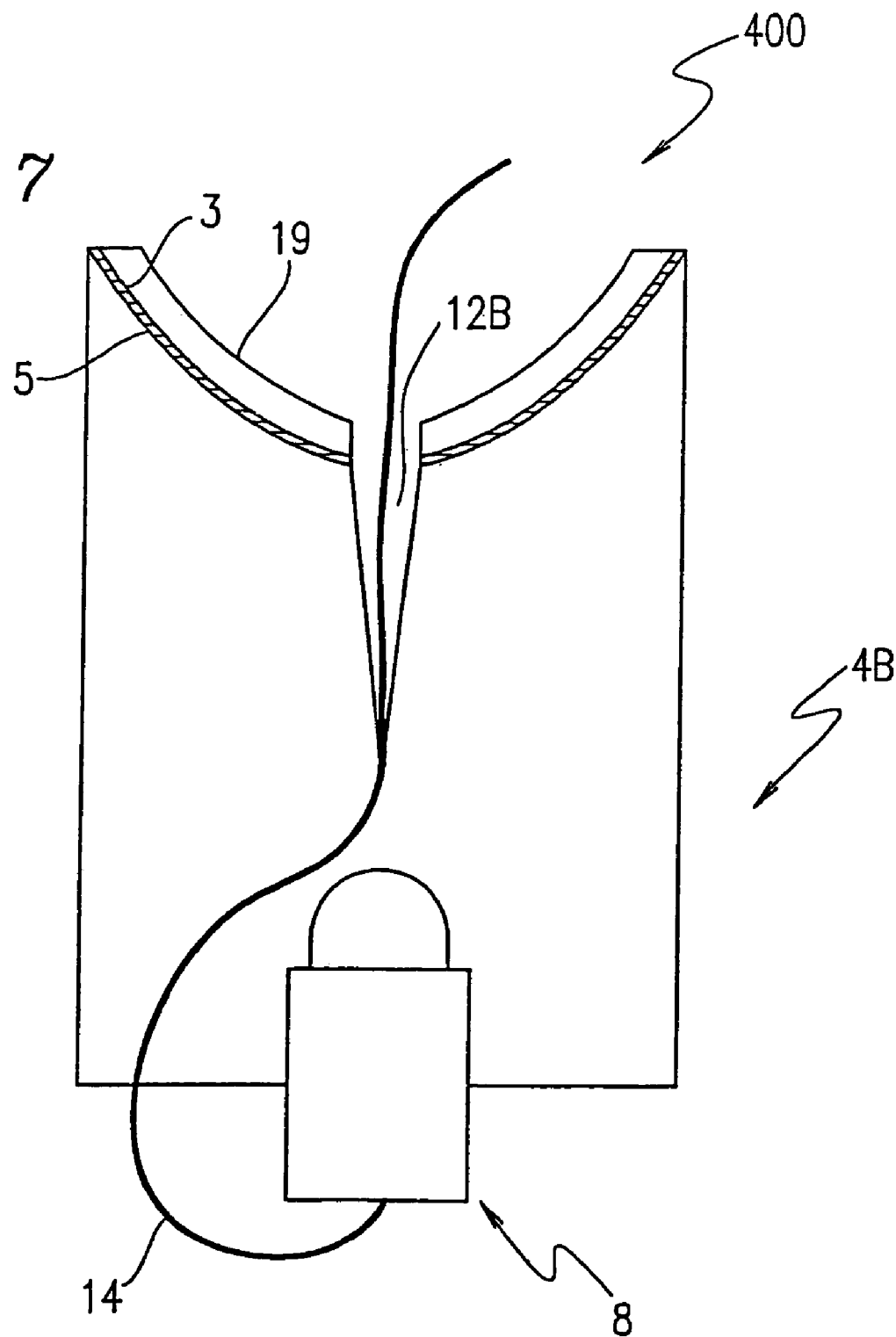
FIG. 7 is a cross-sectional view illustrating a structure of an imaging device according to a fourth example of the present invention.

FIG. 7 is a cross-sectional view of an imaging device 400 according to a fourth example of the present invention. Identical elements previously discussed with respect to FIG. 6 bear identical reference numerals therewith and the detailed descriptions thereof will be omitted. The imaging device 400 in the fourth example is different from the imaging device 300 in the third example in that the imaging device 400 includes an electric wire 14.

The electric wire 14 is provided for supplying electric power and a signal to the imaging mechanism 8. The electric wire 14 passes through the conical hole 12B and is connected to the imaging mechanism 8.

The imaging device 400 can be actually installed via (1) a member for supporting the imaging device 400 attached to one end (i.e., bottom) thereof, or (2) a member for supporting the imaging device 400 attached to another end (i.e., top) thereof. When the member is attached to the top of the imaging device 400, for example, the electric wire 14 connected to the imaging mechanism 8 needs to be extended toward the top of the imaging device 400.

In the fourth example, as shown in FIG. 7, the electric wire 14 is allowed to pass through the conical hole 12B to be connected to the imaging mechanism 8. Since the conical hole 12B is advantageously formed so as not to obstruct the viewing angle provided by the convex rotational mirror 3, the electric wire 14 is not substantially contained in an image taken by the imaging device 400. By contrast, in the case where the electric wire 14 is passed to the outside of the optical member 4B, the electric wire 14 is undesirably included in an image taken by the imaging device 400.

When the member is attached to the bottom of the imaging device 400, the electric wire 14 connected to the imaging mechanism 8 can be extended to the bottom of the imaging device 8. The problem of the electric wire 14 being included in an image does not occur.

EXAMPLE 5

Figure 8:
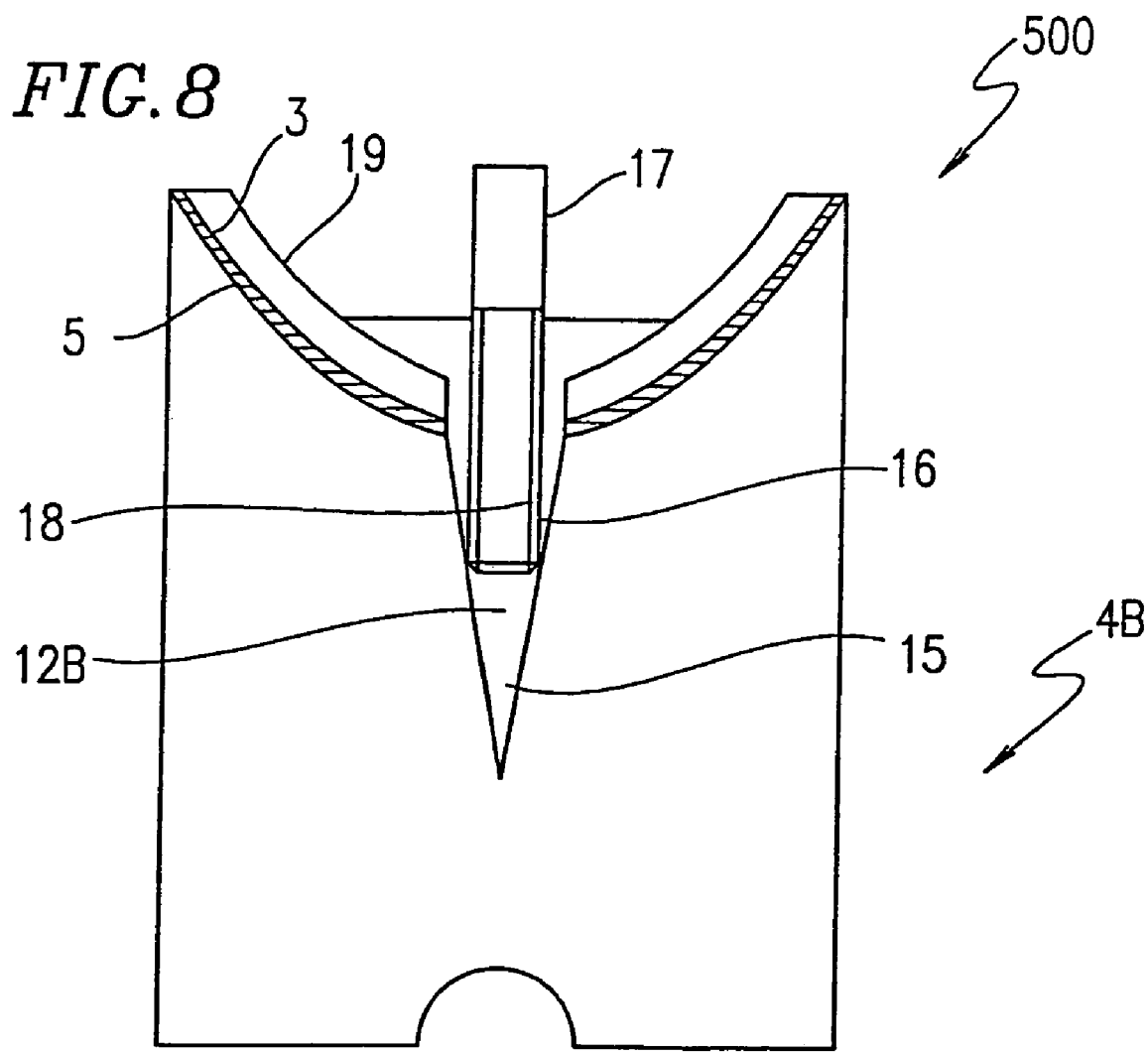
FIG. 8 is a cross-sectional view illustrating a structure of an imaging device according to a fifth example of the present invention.

FIG. 8 is a cross-sectional view of an imaging device 500 according to a fifth example of the present invention. Identical elements previously discussed with respect to FIG. 6 bear identical reference numerals therewith and the detailed descriptions thereof will be omitted.

The imaging device 500 includes an optical member 4B, which has a conical hole 12B (shaped as a body of revolution) centered around the central axis of the optical member 4B. The conical hole 12B is open toward the recessed portion 5. The conical hole 12B has a frosted inner surface. The imaging device 500 also includes a resin member 15. The resin member 15 fills the conical hole 12B and covers an end surface of the convex rotational mirror 3, an end surface of the protective layer 19, and a part of a surface of the protective layer 19. The resin member 15 is tapped along the rotation axis of the convex rotational mirror 3. The imaging device 500 further includes a rod-shaped member 17 for attaching the imaging device 500 to an external member. The rod-shaped member 17 is threaded at an end portion thereof so that a thread 18 is screwed into a thread 16.

The imaging device 500 having the above-described structure operates as follows.

When the rod-shaped member 17 is rotated in a prescribed direction with respect to the optical member 4B around the rotation axis thereof, the thread 18 of the rod-shaped member 17 is screwed into the thread 16 of the resin member 15, thus attaching the rod-shaped member 17 to the optical member 4B. By attaching the rod-shaped member 17 to an external member (not shown) in this state, the imaging device 500 can be easily attached to the external member. Further, the thread 16, which is formed in the resin member 15 filling the conical hole 12B, can be formed to a deep position close to the center of the optical member 4B. Therefore, the imaging device 500 can be attached to the external member with certainty.

As described above, in the fifth example of the present invention, the inner surface of the conical hole 12B substantially has the thread 16 used for attaching the imaging device 500 to the external device. Therefore, the imaging device 500 can be attached to the external device with ease and certainty.

In the example shown in FIG. 7, the resin member 15 having the thread 16 is provided so as to fill the conical hole 12B. The present invention is not limited to such a structure. A tapped resin may be provided so as to fill a cylindrical hole as shown in FIGS. 1 and 2. In such a case, the thread can be formed to a position even deeper within the optical member. Thus, the imaging device can be attached to the external device with a higher strength.

As described above, the present invention provides an imaging device for providing a clear image with a simple structure. The present invention also provides an imaging device for providing a clear image without an increase in the number of production steps therefor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An imaging device, comprising:
a convex mirror for reflecting first incident light representing an object, the convex mirror having a shape of solid of revolution;
an imaging mechanism for taking a reflected image represented by light reflected in the convex mirror; and
an optical member for guiding the first incident light toward the convex mirror and guiding the reflected light toward the imaging mechanism, the optical member having an attenuation section for attenuating second incident light which is incident on an outer circumferential surface of the optical member in an opposite direction to the first incident light, passes through the optical member, is reflected by an inner circumferential surface of the optical member so as to be directed toward the convex rotational mirror, and is superimposed on the first incident light,
wherein the optical member is solid, such that a space between the convex mirror and the optical member is filled with a light-transmissive material.

2. An imaging device, comprising:
a convex mirror for reflecting first incident light representing an object, the convex mirror having a shape of solid of revolution;
an imaging mechanism for taking a reflected image represented by light reflected in the convex mirror; and
an optical member for guiding the first incident light toward the convex mirror and guiding the reflected light toward the imaging mechanism, the optical member having an attenuation section for attenuating second incident light which is incident on an outer circumferential surface of the optical member in an opposite direction to the first incident light, passes through the optical member, is reflected by an inner circumferential surface of the optical member so as to be directed toward the convex rotational mirror, and is superimposed on the first incident light,
wherein the attenuation section is a hole formed in the optical member, and the hole contains an air layer therein having a different light transmittance from that of the optical member so that the second incident light is attenuated by crossing the hole.

3. An imaging device according to claim 2, wherein the hole is shaped so as not to obstruct a viewing angle provided by the convex rotational mirror.

4. An imaging device according to claim 2, wherein the hole is shaped as a body of revolution centered around a rotation axis of the convex rotational mirror.

5. An imaging device according to claim 4, wherein the hole is cylindrical.

6. An imaging device according to claim 4, wherein the hole is conical.

7. An imaging device according to claim 2, wherein the hole has a frosted surface for attenuating the second incident light.

8. An imaging device according to claim 2 further comprising an electric wire for supplying electric power and a signal to the imaging mechanism, the electric wire passing through the hole and connected to the imaging mechanism.

9. An imaging device according to claim 2, wherein the hole is tapped for attaching the imaging device to an external member.

10. An imaging device, comprising:
a convex mirror for reflecting first incident light representing an object, the convex mirror having a shape of solid of revolution;
an imaging mechanism for taking a reflected image represented by light reflected by the convex mirror; and
an optical member for guiding the first incident light toward the convex mirror and guiding the reflected light toward the imaging mechanism, the optical member having a light-shielding section for shielding second incident light which is incident on an outer circumferential surface of the optical member in an opposite direction to the first incident light and passes through the optical member toward an inner circumferential surface of the optical member,
wherein the optical member is solid, such that a space between the convex mirror and the optical member is filled with a light-transmissive material.

11. An imaging device, comprising:
a convex mirror for reflecting first incident light representing an object, the convex mirror having a shape of solid of revolution;
an imaging mechanism for taking a reflected image represented by light reflected by the convex mirror; and
an optical member for guiding the first incident light toward the convex mirror and guiding the reflected light toward the imaging mechanism, the optical member having a light-shielding section for shielding second incident light which is incident on an outer circumferential surface of the optical member in an opposite direction to the first incident light and passes through the optical member toward an inner circumferential surface of the optical member,
wherein the light-shielding section is a hole formed in the optical member, and the imaging device further includes a light-shielding thin film for shielding the second incident light.

* * * * *